Figure 1:
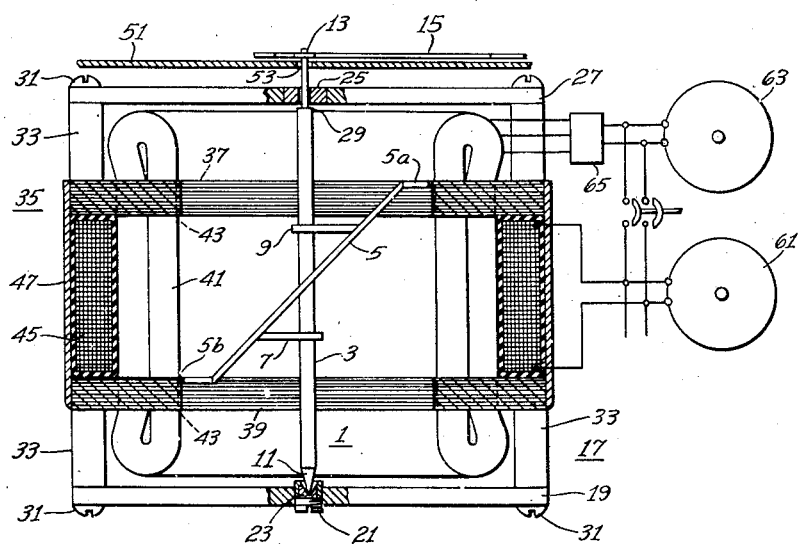

April 19, 1949.                H. F. BUSH                  2,467,729
                    POLARIZED ARMATURE SYNCHROSCOPE
                         Filed April 1, 1944

WITNESSES:                                          INVENTOR
                                                Howard F. Bush.
                                             BY
                                                    ATTORNEY Patented Apr. 19, 1949

2,467,729

UNITED STATES PATENT OFFICE 2,467,729

POLARIZED ARMATURE SYNCHROSCOPE

Howard F. Bush, Florham Park, N. J., assignor to Westinghouse Electric Corporation, East Pittsburgh, Pa., a corporation of Pennsylvania Application April 1, 1944, Serial No. 529,130

6 Claims. (Cl. 172—245)

This invention relates to electrical instruments and it has particular relation to electrical instruments, wherein a magnetic member is disposed for rotation with respect to a field assembly in response to a magnetic field produced by the field assembly.

In one of the most conventional supporting structures for the rotating part of an electrical instrument, a shaft is provided with conical ends and each of the conical ends is positioned for rotation in a cup or V-type bearing. Such bearings are desirable for the reason that they permit rotation of the shaft without excessive friction. However, if the shaft carries a member, such as a pointer, which is designed for rotation over a substantial arc or continuously, such bearing construction is objectionable for the reason that it requires a bridge extending over the path of movement of the pointer. This bridge not only offers mechanical problems of construction, but tends to obscure the pointer for a substantial portion of the movement thereof. In order to eliminate a bridge which extends over the pointer, it has been proposed that a ring bearing be employed through which an end of the shaft projects. Although the ring-bearing offers a reasonably low friction to rotation of the shaft, it is not suitable for taking end-thrust of the shaft.

In accordance with the invention, an electrical instrument has a shaft provided with a ring-bearing, and a magnetic force is employed for relieving the ring-bearing of end-thrust. The invention is particularly suitable for electrical instruments having magnetic elements disposed for rotation with respect to a field assembly in response to a magnetic field produced by the field assembly. Moving-iron electrical instruments are representative, but the invention is particularly suitable for instruments responsive to the phase displacement between a pair of alternating quantities, such as a synchroscope or a power factor meter.

In a synchroscope of well-known construction, a magnetic member is disposed for rotation with respect to a field assembly which includes a polarizing winding for polarizing a magnetic member and a field winding for producing a rotating magnetic field within which the magnetic member is positioned for rotation. If the magnetic member is displaced in a direction parallel to its axis of rotation from its normal position in the magnetic field, the magnetic field by solenoid action tends to return the magnetic member to its normal position. In accordance with the invention, a thrust-bearing is employed for displacing the magnetic member in an axial direction away from a position toward which the magnetic field tends to urge the magnetic member. Under such conditions, the thrust-bearing takes all end-thrust of the magnetic member during operation of the instrument. Consequently, a ring-bearing may be associated with the thrust-bearing for mounting the magnetic member for rotation without requiring the ring-bearing to take end-thrust. If a pointer or other member is associated with the magnetic member by means of a shaft passing through the ring-bearing, the pointer may be arranged for unrestricted rotation, and is visible in all positions. At the same time, the friction of the instrument is not excessive.

It is, therefore, an object of the invention to provide an instrument having a rotor assembly with improved means mounting the rotor assembly for rotation with respect to a stator assembly.

It is a further object of the invention to provide an electrical instrument having a rotor assembly and a stator assembly, wherein means mounting the rotor assembly for rotation with respect to the stator assembly are all disposed on one side of a member attached to the rotor assembly.

It is a still further object of the invention to provide an electrical instrument having a rotor assembly and a stator assembly, wherein during operation of the instrument the rotor assembly has applied thereto a magnetic force which produces end-thrust of the rotor assembly in only one direction.

It is another object of the invention to provide an instrument responsive to the phase displacement between two alternating quantities wherein a rotor assembly is mounted in bearings for rotation and wherein the alternating quantities develop a magnetic field which produces end-thrust of the rotor assembly in a predetermined direction.

Figure 2:
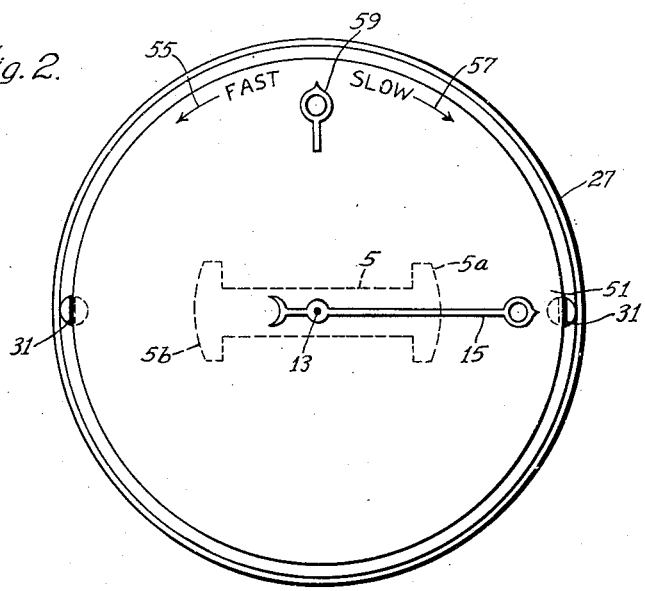

Other objects of the invention will be apparent from the following description, taken in conjunction with the accompanying drawing, in which:

Fig. 1 is a view in sectional elevation of an electrical instrument embodying the invention, with circuit connections therefor shown schematically; and Fig. 2 is a view in top plan of the electrical instrument illustrated in Fig. 1.

Referring to the drawing, Figure 1 shows an electrical instrument which is responsive to the phase displacement between two alternating quantities. Such an instrument may be employed as a synchroscope. The instrument of Fig. 1 includes a rotor assembly 1 having a shaft 3 and a magnetic member 5 secured to the shaft for rotation therewith. The magnetic member 5 may be formed of soft iron, or may be formed of an alloy similar to that disclosed in Patent No. 1,807,021 and available under the trade-name "Hipernik." The magnetic member 5 may be secured to the shaft 3 by means of suitable brackets 7 and 9. The shaft 3 is designed to be supported in bearings positioned adjacent its ends, and the shaft may be suitably configured for reception in such bearings. In the specific embodiment of Fig. 1, the shaft is provided at one end with a conical pivot 11, and at its opposite end with a bearing pin 13 having a diameter smaller than that of the main body of the shaft. The rotor assembly is completed by a member 15 which is attached to the end of the bearing pin 13 for rotation therewith. As a specific example, the member 15 may take the form of a pointer for indicating the rotation of the shaft.

The rotor assembly 1 is mounted for rotation with respect to a stator or field assembly 17. The stator assembly 17 includes a bridge plate 19 having a bearing screw 21 associated therewith. This bearing screw receives the conical pivot 11, and is designed to take end-thrust of the shaft 3. A suitable bearing for this purpose may include a cup or V-type jewel 23 which is suitably secured in the bearing screw.

In some prior instruments, it has been the practice to provide a bearing screw similar to the bearing screw 21 for receiving the end of the bearing pin 13. However, such a construction requires a bridge which extends over the pointer 15, and obscures the pointer during a portion of its rotation. In order to leave the pointer 15 free for observation in all positions thereof, the bearing means for the shaft 3 is disposed entirely on one side of the pointer. A ring-bearing 25 is provided which has an opening through which the bearing pin 13 extends. The ring-bearing conveniently may be in the form of a ring jewel, and is secured to a bridge plate 27. It will be observed that the shaft 3 has a shoulder 29 adjacent the ring-bearing 25 to restrict axial movement of the shaft 3 in an upward direction, as viewed in Fig. 1. The bridge plates 19 and 27 are attached by suitable machine screws 31 and spacers 33 to a magnetic structure 35.

The magnetic structure 35 surrounds the magnetic member 5, and has an air-gap within which the magnetic member is rotatable. Preferably, the magnetic structure 35 is divided into a pair of magnetic parts in the form of rings 37 and 39 which are spaced axially along the shaft 3. These rings may be formed of solid magnetic material, but in order to reduce the hysteresis losses and for ease in construction thereof, the rings 37 and 39 are formed of a plurality of laminations of suitable material, such as soft iron. It will be noted that the magnetic member 5 has ends 5a and 5b which are positioned respectively adjacent the interior surfaces of the rings 37 and 39.

The magnetic structure 35 also includes a polyphase winding 41 which is distributed in slots 43 around the rings 37 and 39. This polyphase winding when energized is designed to produce a rotating magnetic field in the air-gap containing the magnetic member 5. The design of such a polyphase winding is well understood in the art, and is similar to the polyphase windings employed for the stators of induction motors and synchronous motors. For this reason, a more detailed description thereof is believed to be unnecessary.

An additional winding 45, which may be termed a polarizing winding, is associated with the magnetic structure for directing magnetic flux through the magnetic member 5. This polarizing winding 45 conveniently may surround the polyphase winding 41, and may be positioned between the rings 37 and 39, as illustrated in Fig. 1. The magnetic circuit for magnetic flux produced by current flowing in the winding 45 may be completed by a magnetic band 47 which surrounds the winding 45. When the winding 45 is energized, magnetic flux is produced which is directed through a series magnetic circuit formed by the ring 37, the magnetic member 5, the ring 39, and the magnetic band 47. Such magnetic flux polarizes the magnetic member 5.

If the shoulder 29 on the shaft 3 contacts the ring-bearing 25 during operation of the electrical instrument, the friction developed therebetween may be excessive and objectionable. In order to prevent such contact between the shoulder and the ring-bearing, a magnetic force is applied to the rotor assembly 1 which urges the rotor assembly in a downward direction, as viewed in Fig. 1. This magnetic force may be produced simply by positioning the ends 5a and 5b of the magnetic member adjacent the upper faces of the magnetic rings 37 and 39, as shown in Fig. 1.

When a magnetic member is withdrawn from the center of a magnetic field toward the fringes of the magnetic field, a magnetic force is developed which urges the magnetic member toward the center of the magnetic field to provide a magnetic path of minimum reluctance for the magnetic flux in the magnetic field. The force acting on the magnetic member is produced by what may be termed "solenoid action." Consequently, when the ends 5a and 5b of the magnetic member are positioned adjacent the upper faces of the rings 37 and 39, the force applied to the magnetic member 5 by the magnetic field has a component produced by solenoid action which urges the shaft 3 toward the bearing screw 21. Since the bearing screw 21 is designed to take end-thrust with a minimum of friction, such a force is not objectionable. The magnitude of the force urging the shaft 3 toward the bearing screw 21 may be increased by raising the magnetic member 5 still further with respect to the magnetic rings 37 and 39. However, it is desirable that the force be restricted to the lowest value necessary to keep the shoulder 29 away from the ring-bearing 25 during operation of the instrument. When the instrument is not in operation, mechanical vibration may urge the shoulder 29 against the ring-bearing 25. However, such contact is not objectionable during the periods when the instrument is not in use.

To facilitate observation of the rotation of the pointer 15, a suitable dial plate 51 may be associated therewith. This dial plate has an opening 53 through which the bearing pin 13 extends. The dial plate 51 may bear any desired markings or indicia for cooperation with the pointer 15. For example, if the instrument is to be employed as a synchroscope, the dial plate 51 may have arrows 55 and 57 thereon to indicate the directions of movement of the pointer 15 when the machine to be synchronized is fast or slow. In addition, the reference mark 59 may be printed on the entire plate 51 intermediate the arrows 55 and 57.

It is believed that the operation of the instrument illustrated in Fig. 1 is apparent from the foregoing description. Let it be assumed that the instrument is employed as a synchroscope in association with two alternating-current single-phase generators 61 and 63. One of the generators 61 is connected to the winding 45. If the generators are sixty-cycle alternating-current generators, the winding 45 is energized to direct alternating magnetic flux through the magnetic member 5 to polarize the magnetic member. The alternating-current generator 63 is connected to the polyphase winding 41 through a device suitable for changing the alternating voltage received from the generator 63 into polyphase voltages suitable for energizing the polyphase winding 41. Although a two-phase polyphase winding may be employed for the winding 41, somewhat smoother operation has been obtained from a three-phase winding. When a three-phase winding 41 is employed, the device 65 may be similar to that illustrated in the Oman Patent No. 2,253,392.

When energized, the winding 41 produces a rotating magnetic field in the air-gap containing the magnetic member 5. As well understood in the art, the rotating magnetic field cooperates with the polarized magnetic member 5 to indicate the phase displacement between the voltages of the generators 61 and 63. If the phase displacement is continuously changing, as during the period when one of the generators is coming up to speed, the magnetic member 5 is rotated continuously with respect to the stator assembly.

Energization of the stator assembly also results in a force applied to the magnetic member 5 by solenoid action. It will be recalled that this force is produced because the rotor assembly is displaced upwardly by the bearing screw 21, as viewed in Fig. 1, from the position toward which it is urged by the magnetic field in the air-gap. Because of this force, the shaft 3 develops end-thrust only in a downward direction, as viewed in Fig. 1, toward the bearing screw 21. Since the bearing screw 21 is designed to take such end-thrust without excessive friction, satisfactory operation of the instrument is assured. It should be noted further that the shoulder 29 is maintained away from the ring-bearing 25 by the aforesaid end-thrust. Consequently, excessive friction due to the engagement of the shoulder 29 with the ring-bearing 25 is avoided during operation of the instrument.

Although the invention has been described with reference to certain specific embodiments thereof, numerous modifications are possible, therefore the invention is to be restricted only by the appended claims.

I claim as my invention:

1. In an electrical instrument, a field assembly effective when energized for producing a magnetic field, an assembly having a magnetic member positioned in said magnetic field to develop a torque acting between said field assembly and said magnetic member about a predetermined axis, means mounting one of said assemblies for rotation in response to said torque about said axis relative to the other of said assemblies, said magnetic member being spaced axially along said axis from the position offering minimum reluctance to magnetic flux of said magnetic field passing therethrough, whereby said magnetic field urges said magnetic member in a predetermined direction axially along said axis with respect to said field assembly, said mounting means including bearing means for restricting movement of said magnetic member in said predetermined direction, said bearing means holding the magnetic member away from said position offering minimum reluctance.

2. In an electrical instrument, a field assembly effective when energized for producing a magnetic field, a shaft, means mounting said shaft for rotation relative to said field assembly, a magnetic member secured to said shaft, said magnetic member being positioned in said magnetic field to develop a torque acting between said field assembly and said magnetic member about the axis of said shaft, said magnetic member being spaced axially along said axis from a position toward which said magnetic field urges said magnetic member, whereby said magnetic field urges said magnetic member in a predetermined direction axially along said axis with respect to said field assembly, said mounting means including a thrust-bearing cooperating with a first end of said shaft for restricting movement of said magnetic member in said predetermined direction, and a ring-bearing through which a second end of said shaft extends, said thrust bearing maintaining the magnetic member spaced axially along said axis from the position towards which said magnetic field urges the magnetic member.

3. In an electrical instrument responsive to the phase displacement between two alternating quantities, a field assembly effective when energized in accordance with one of said quantities for producing a rotating magnetic field, a magnetic member positioned in said magnetic field, polarizing means effective when energized by another of said quantities for polarizing said magnetic member, and means mounting said magnetic member for rotation about an axis in accordance with the phase displacement between said quantities, said magnetic member being displaced axially along said axis from the position wherein it establishes a path of minimum reluctance for magnetic flux passing therethrough, whereby the resultant magnetic field acting on said magnetic member urges said magnetic member in an axial direction, said mounting means including means for restricting movement of said member in said axial direction, said mounting means being disposed to hold said member and said assembly in relative positions such that said second component is continuously produced.

4. In an electrical instrument responsive to the phase displacement between two alternating quantities, a field assembly effective when energized in accordance with one of said quantities for producing a rotating magnetic field, a shaft, a magnetic member carried by said shaft and positioned in said magnetic field, polarizing means effective when energized by another of said quantities for polarizing said magnetic member, and means mounting said shaft and said magnetic member for rotation about the axis of said shaft in accordance with the phase displacement between said quantities, said magnetic member being displaced axially along said axis from the position wherein it establishes a path of minimum reluctance for magnetic flux passing therethrough, whereby the resultant magnetic field acting on said magnetic member urges said magnetic member in an axial direction, said mounting means including a thrust-bearing cooperating with a first end of said shaft for restricting movement of said magnetic member in said axial direction, and a ring-bearing through which a second end of said shaft passes, a dial member having an opening through which said second end of the shaft passes, and an element attached to the second end of said shaft for unrestricted movement over said dial member in response to rotation of said shaft, said mounting means being disposed to hold said member and said assembly in relative positions such that said second component is continuously produced.

5. In an electrical instrument, a field assembly effective when energized for producing a magnetic field in an air-gap, a magnetic member disposed in said magnetic field for developing a torque acting between said field assembly and said magnetic member about an axis, and means mounting said magnetic member for rotation about said axis relative to said field assembly in response to said torque, said field assembly comprising a pair of magnetic parts spaced along said axis and bordering said air-gap for directing magnetic flux therethrough, said magnetic member having a separate end positioned for rotation adjacent each of said magnetic parts to form a magnetic bridge across said air-gap between said magnetic parts, said mounting means including a thrust-bearing maintaining said magnetic member displaced axially from a position toward which said magnetic field urges the magnetic member.

6. In an electrical instrument responsive to the phase displacement between two alternating quantities, a field effective when energized for producing a magnetic field in an air-gap, a magnetic member disposed in said air-gap for developing a torque acting between said field assembly and said magnetic member about an axis in response to said magnetic field, and means mounting said magnetic member for rotation about said axis relative to said field assembly in response to said torque, said field assembly comprising a pair of magnetic parts spaced along said axis and bordering said air-gap for directing magnetic flux therethrough, a field winding associated with said magnetic parts for producing a rotating magnetic field in said air-gap, a polarizing winding, said magnetic member having a separate end position for rotation adjacent each of said magnetic parts to define with said magnetic parts a series magnetic path for magnetic flux produced by said polarizing winding, said mounting means including a shaft supporting the magnetic member for rotation about said axis, thrust-bearing means cooperating with a first end of said shaft for maintaining said magnetic member displaced axially from a position relative to said field assembly toward which said magnetic flux urges the magnetic member, and a ring-bearing through which a second end of said shaft extends, and a member secured to said second end of the shaft for rotation therewith.

HOWARD F. BUSH.

REFERENCES CITED

The following references are of record in the file of this patent:

UNITED STATES PATENTS

| Number | Name | Date |
|---|---|---|
| 457,902 | Kintner | Aug. 18, 1891 |
| 588,666 | Stanley et al. | Aug. 24, 1897 |
| 695,913 | Conrad | Mar. 25, 1902 |
| 796,067 | Duncan | Aug. 1, 1905 |
| 1,283,433 | Warren | Oct. 29, 1918 |
| 1,695,850 | Kates | Dec. 18, 1928 |